United States Patent [19]

Gibbs

[11] 4,283,515

[45] Aug. 11, 1981

[54] SUPPORT, CATALYST AND PROCESS FOR POLYMERIZING OLEFINS

[75] Inventor: Ronald L. Gibbs, Midland, Mich.

[73] Assignee: The Dow Chemical Company, Midland, Mich.

[21] Appl. No.: 160,331

[22] Filed: Jun. 17, 1980

Related U.S. Application Data

[60] Continuation-in-part of Ser. No. 24,488, Mar. 27, 1979, abandoned, which is a continuation-in-part of Ser. No. 973,351, Dec. 26, 1978, abandoned, which is a division of Ser. No. 920,769, Jun. 30, 1978, abandoned, which is a continuation-in-part of Ser. No. 837,665, Sep. 29, 1977, abandoned.

[51] Int. Cl.$^3$ .......................... C08F 4/02; C08F 10/02
[52] U.S. Cl. .............................. 526/127; 252/429 B; 526/125; 526/128; 526/352
[58] Field of Search .................... 526/127, 128, 125

[56] References Cited

U.S. PATENT DOCUMENTS

| 3,644,318 | 2/1972 | Diedrich et al. | 526/124 |
| 4,071,672 | 1/1978 | Kashiwa | 526/125 |
| 4,115,319 | 9/1978 | Scata et al. | 526/125 |

FOREIGN PATENT DOCUMENTS 2461677  7/1975  Fed. Rep. of Germany ........... 526/125

*Primary Examiner*—Edward J. Smith
*Attorney, Agent, or Firm*—J. G. Carter

[57] ABSTRACT

Olefins are polymerized in the presence of a catalyst which is prepared by the controlled reaction of an aliphatic alcohol such as n-propyl alcohol and a mixture of an alkyl magnesium compound such as n-butyl, sec-butyl magnesium and a silicon tetrahalide such as SiCl$_4$. After washing the precipitate several times with a hydrocarbon such as hexane, it is suspended in a hydrocarbon such as hexane and a titanium compound such as TiCl$_4$ is added after which a suitable reducing agent such as diethyl aluminum chloride is added. The thus formed solid catalyst is washed several times with a hydrocarbon solvent such as hexane.

14 Claims, No Drawings

SUPPORT, CATALYST AND PROCESS FOR POLYMERIZING OLEFINS

CROSS REFERENCE TO RELATED APPLICATION

This is a continuation-in-part of application Ser. No. 024,488, filed Mar. 27, 1979 (now abandoned), which is a continuation-in-part of application Ser. No. 973,351 filed Dec. 26, 1978 (now abandoned), which is a division of application Ser. No. 920,769 filed June 30, 1978 (now abandoned), which is a continuation-in-part of application Ser. No. 837,665 filed Sept. 29, 1977 (now abandoned).

BACKGROUND OF THE INVENTION

This invention relates to catalyst supports, catalysts, process for preparing such catalyst supports and catalysts and process for polymerizing olefins.

It is well known that olefins such as ethylene, propylene, and 1-butene can be polymerized in the presence of metallic catalysts, particularly the reaction products of organometallic compounds and transition metal compounds to form substantially unbranched polymers of relatively high molecular weight. Typically such polymerizations are carried out at relatively low temperatures and pressures. The resulting generally linear olefin polymers are characterized by greater stiffness and higher density than olefin polymers having highly branched polymer chains.

Among the methods for producing linear olefin polymers, some of the most widely utilized are those described by Professor Karl Ziegler in U.S. Pat. Nos. 3,113,115 and 3,257,332. In these methods, the catalyst employed is obtained by admixing a compound of a transition metal of Groups 4b, 5b, 6b and 8 of Mendeleev's Periodic Table of Elements with an organometallic compound. Generally the halides and oxyhalides of titanium, vanadium and zirconium are the most widely used transition metal compounds. Outstanding examples of the organometallic compounds include hydrides, alkyls and haloalkyls of aluminum, alkyl aluminum halides, Grignard reagents, alkali metal aluminum hydrides, alkali metal borohydrides, alkali metal hydrides, alkaline earth metal hydrides and the like.

Usually, polymerization is carried out in a reaction medium comprising an inert organic liquid, e.g., an aliphatic hydrocarbon, and the aforementioned catalyst. One or more olefins may be brought into contact with the reaction medium in any suitable manner, and a molecular weight regulator, which is normally hydrogen, is usually present in the reaction vessel in order to control the molecular weight of the polymers.

Following polymerization, it is common to remove catalyst residue from the polymer by separating the polymer from the inert liquid diluent and then repeatedly treating the polymer with an alcohol or similar deactivating agent. Such catalyst deactivation and/or removal procedures are expensive both in time and material consumed as well as the equipment required to carry out such treatment.

Furthermore, most of the aforementioned known catalyst systems are more efficient in preparing polyolefins in slurry (i.e., wherein the polymer is not dissolved in the carrier) than in solution (i.e., wherein the temperature is high enough to solubilize the polymer in the carrier). The lower efficiencies of such catalysts in solution polymerization is generally believed to be caused by the general tendency of such catalyst to become rapidly depleted or deactivated by significantly higher temperatures than are normally employed in solution processes.

In view of the expense of removing catalyst residues from the polymer, it would be highly desirable to provide a polymerization catalyst which is sufficiently active, even at solution polymerization temperatures, to produce such high quantities of polymer per unit of catalyst that it is no longer necessary to remove catalyst residue in order to obtain polymer of the desired purity.

SUMMARY OF THE INVENTION

The present invention, in one aspect, is a catalyst support prepared by the reaction of an alcohol with a mixture of an organomagnesium compound and a silicon halide represented by the formula $R'_{4-n}SiX_n$. Said mixture is prepared in a non-polar solvent. The solid product is then washed several times with a liquid hydrocarbon so as to remove the soluble components.

It is preferred to prepare the support by the controlled addition of the alcohol to the mixture of organomagnesium compound and silicon halide. Alternatively, the mixture of organomagnesium compound and silicon halide can be added to the aliphatic alcohol. The reaction is not temperature dependent within normal chemical reaction limits except as desired to control the particle size of the catalyst support.

In another aspect of the present invention, a catalyst is prepared by adding to the above described support a transition metal compound of the Groups 4b, 5b, 6b, 7b or 8 of Mendeleev's Periodic Table of Elements, followed by the addition of a reducing agent under conditions which produces a catalytically active solid product. After completion of the reaction, the solid catalyst is washed several times with a liquid hydrocarbon to remove the unreacted quantities of the reactants and hydrocarbon soluble reaction products. Then, when desired, an aluminum alkyl co-catalyst is employed by either adding to the above prepared catalyst or by adding separately to the polymerization reactor. The magnesium:transition metal atomic ratio is from about 0.1:1 to about 30:1, preferably from about 0.2:1 to about 3:1 and the aluminum:transition metal atomic ratio is from about 5:1 to about 200:1 preferably from about 10:1 to about 30:1.

Still another aspect of the present invention is a process for polymerizing α-olefins in the presence of the previously mentioned catalyst under conditions characteristic of Ziegler polymerization.

The catalyst of the present invention provides a means for reducing polymer buildup on the reactor walls, control of the polymer particle size by varying the temperature at which the support is formed and the temperature and rate at which the reducing agent is added, as well as limited control of the molecular weight distribution, low color in the polymer and a good bulk density when the polymer is produced by the slurry process.

DETAILED DESCRIPTION OF THE PREFERRED EMBODIMENTS

The present invention is most advantageously practiced in a polymerization process wherein an α-olefin is polymerized, generally in the presence of hydrogen as a molecular weight control agent, in a polymerization zone containing an inert diluent and the reaction product as hereinbefore described. The foregoing polymerization process is most beneficially carried out under inert atmosphere and relatively low temperature and pressure, although very high temperatures and pressures are optionally employed.

Olefins which are suitably polymerized or copolymerized in the practice of this invention are generally the aliphatic α-monoolefins having from 2 to 18 carbon atoms. Illustratively, such α-olefins can include ethylene, propylene, butene-1, pentene-1, 4-methylpentene-1, 3-methylbutene-1, hexene-1, octene-1, dodecene-1, octadecene-1 and the like. It is understood that the α-olefins may be copolymerized with other α-olefins and/or with other ethylenically unsaturated monomers such as butadiene, isoprene, pentadiene-1,3, styrene, α-methylstyrene and similar ethylenically unsaturated monomers which do not destroy conventional Ziegler catalysts. Most benefits are realized in the polymerization of aliphatic α-monoolefins particularly ethylene and mixtures of ethylene and quantities which provide up to about 20, especially from about 0.1 to about 10, weight percent of propylene, butene-1, hexene-1, octene-1 or similar higher α-olefin, or mixtures thereof, based on total monomer in the resultant polymer.

The catalyst support employed herein is that solid product resulting from the reaction of an alcohol (R''OH) with a mixture of a hydrocarbon soluble organomagnesium compound ($MgR_2$) and a silicon halide ($R'_{4-n}SiX_n$), in a non-polar solvent, wherein the molar ratio of $ROH:MgR_2$ is at least 2:1 and the molar ratio of $ROH:R'_{4-n}SiX_n$ is such that there is present at least one, preferably 2 to 3 X groups per OH group.

As previously stated, if desired, the mixture of organomagnesium compound and silicon halide can be added to the aliphatic alcohol.

Suitable non-polar solvents for the mixture of organomagnesium compound and silicon halide include aliphatic and aromatic hydrocarbons having from about 5 to about 10, preferably from about 6 to about 8 carbon atoms such as, for example, pentane, hexane, heptane, octane, nonane, decane, benzene, toluene, xylene, mixtures thereof and the like. The preferred hydrocarbon is that which is ultimately to be employed in the α-olefin polymerization reaction.

The purpose of employing the mixture of organo magnesium compound and the silicon halide in a non-polar solvent is to prevent the usual reaction which occurs when such compounds are employed in polar solvents such as diethyl ether or tetrahydrofuran.

The particular criteria for the ratios of reactants being that there should be present at least one equivalent of alcohol for each alkyl group contained in the organomagnesium compound.

Suitable organomagnesium compounds are those represented by the formula $MgR_2$ which are hydrocarbon soluble wherein each R is independently an aliphatic hydrocarbon group having from 1 to about 20 carbon atoms, preferably from about 2 to about 8 carbon atoms such as, for example, butyl isobutyl magnesium, butyl hexyl magnesium, dihexyl magnesium, dioctyl magnesium, butyl ethyl magnesium, butyl octyl magnesium, mixtures thereof and the like.

Also included are organomagnesium compounds represented by the above formula, $MgR_2$, which are hydrocarbon insoluble, but are readily rendered hydrocarbon soluble by the addition of small solubilizing quantities, e.g. from about 5% to about 50%, preferably from about 10% to about 20% by weight of an organo aluminum compound such as triisobutylaluminum, triethylaluminum or other alkyl aluminum compounds or other suitable solubilizing compound, such as an aluminum alkoxide, which does not poison Ziegler polymerization catalysts.

Such organomagnesium compounds which are normally insoluble in hydrocarbons but which can be rendered soluble as above stated include, for example, dibutyl magnesium, butyl ethyl magnesium, ethyl hexyl magnesium, dihexyl magnesium, butyl octyl magnesium, mixtures thereof and the like.

The use of such compounds as mentioned above includes the solubilizing quantity of the organo aluminum compound.

In some instances, it may be desirable to add small quantities of an organo aluminum compound, including aluminum alkoxides, even though the organomagnesium compound is sufficiently soluble so as to lower the viscosity.

Suitable silicon halide compounds which can be employed herein include those compounds wherein R' is an alkyl group of from 1 to about 20 carbon atoms, preferably from 1 to about 6 carbon atoms and X is Cl, Br or I and n has a value of from 1 to 4 such as for example, $SiCl_4$, $SiBr_4$, $CH_3SiCl_3$, $(C_2H_5)_2SiCl_2$, $(CH_3)_3SiCl$, mixtures thereof and the like.

Suitable alcohols (R''OH) which can be employed herein include those having from 1 to about 20 carbon atoms, preferably from 1 to about 6 carbon atoms, such as, for example, methanol, ethanol, allyl alcohol, n-propanol, isopropanol, n-butanol, sec-butanol, tert-butanol, octadecanol, benzyl alcohol, mixtures thereof and the like.

The temperature of the ROH and mixture of organo magnesium compound and silicon halide is usually maintained from about 0° C. to about the boiling point of the hydrocarbon in which the organomagnesium compound and silicon halide is dissolved, preferably from about 100° C. or less and more preferably from about 0° C. to about 70° C., to control the particle size of the support and subsequently the particle size of the polymer.

If during the preparation of the support, the temperature employed is above 40° C., the temperature should be, immediately after completion of the reaction, lowered to at least about 25° C. so as to prevent sintering (aggregation) of the particles. The reaction is essentially instantaneous with the addition of the alcohol which is added incrementally so as to aid in the contol of the temperature since the reaction is exothermic.

The thus prepared support is then washed with a liquid hydrocarbon so as to remove any of the unreacted reactants and soluble by-products. Suitable such hydrocarbons include for example, those having from about 6 to about 8, carbon atoms, such as, for example, pentane, hexane, heptane, octane, nonane, decane, benzene, toluene, xylene, mixtures thereof and the like. The preferred hydrocarbon is that which is ultimately to be employed in the α-olefin polymerization reaction.

The catalyst of this invention is prepared by adding to the above prepared support suspended in any of the aforementioned hydrocarbons, a transition metal compound followed by the addition, preferably in a controlled manner, of a suitable reducing agent under conditions which produces a catalytically active solid product. Such conditions suitably are at a temperature below the boiling point of the hydrocarbon diluent preferably below about 100° C., most preferably below about 70°

C. When the catalyst is prepared at pressures above atmospheric, the lower boiling diluents can be employed at temperatures above their atmospheric boiling point but the temperature should not exceed the boiling point of the diluent at the particular pressure employed. The hydrocarbon is removed by any suitable means such as decantation, filtration or the like and the solid catalyst is washed with hydrocarbon to remove any unreacted materials and/or reaction products.

The atomic ratio of magnesium contained in the support to the transition metal employed is from about 0.1:1 to about 30:1, preferably from about 0.2:1 to about 3:1.

The above prepared catalyst can then be employed either alone or in the presence of, as a co-catalyst, an organometallic compound which is a halide, hydride or totally alkylated derivative of the metals of Groups 1a, 2a, 2b, 3a or 4a of the Periodic Table such as, for example, triisobutyl aluminum, triethyl aluminum, diethylaluminum chloride, ethylmagnesium bromide, diisobutylaluminum hydride, mixtures thereof and the like, so as to provide a metal (Group 1a, 2a, 2b, 3a or 4a): transition metal atomic ratio of from about 1:1 to about 200:1 preferably from about 10:1 to about 30:1.

Exemplary transition metal compounds include, for example, the halides, such as the chlorides, bromides, and iodides of the transition metals of Groups 4b, 5b, 6b, 7b and 8 of Mendeleev's Periodic Table of Elements as set forth in *Handbook of Chemistry and Physics,* CRC, 48th Edition (1967–68). Exemplary metals include, for example, titanium, chromium, zirconium, vanadium, tungsten, manganese, molybdenum, ruthenium, rhodium, cobalt, and nickel with titanium, vanadium and zirconium either separately or in combination being preferred. Exemplary preferred transition metal compounds are titanium tetrachloride, titanium trichloride, zirconium tetrachloride, vanadium tetrachloride, vanadium pentachloride, vanadium oxydichloride with the halides, particularly the chlorides, of titanium being most preferred.

Exemplary reducing agents are those of conventional Ziegler catalysts including metals such as aluminum, sodium and lithium; hydrides thereof such as lithium aluminum hydride, or sodium borohydride; Grignard reagents such as phenylmagnesium bromide; and preferably organometallic compounds, especially alkyl aluminum compounds, mixtures thereof and the like. For the purposes of illustration, the alkyl aluminum compounds can be represented by the general formula RAlYY' wherein R is alkyl, most advantageously containing from 1 to 12 carbon atoms, or hydrogen; each Y and Y' is selected from the group consisting of alkyl or alkoxy groups having from 1 to 12 carbon atoms, hydrogen, and halogen, e.g., chlorine or bromine.

The reducing agent or mixture of reducing agents can be added as pure compounds or they may be added as a mixture in an inert medium, particularly those inert mediums employed in preparing the support.

In the preparation of the catalyst of the present invention, it is preferred to add the reducing agent in a controlled manner, i.e. incrementally rather than all at once.

Examples of especially preferred compounds corresponding to the formula RAlYY', include trimethylaluminum, triethylaluminum, triisobutylaluminum, tri-n-butylaluminum, tri-n-pentylaluminum, triisooctylaluminum, tri-n-decylaluminum, tri-n-dodecylaluminum, diethylaluminum chloride, diethylaluminum hydride, mixtures thereof and the like. Especially preferred are triethylaluminum, triisobutylaluminum and diethylaluminum chloride. Other organometallic compounds which are likewise suitable include butyllithium, amylsodium, phenylsodium, dimethylmagnesium, diethylmagnesium, diethylzinc, butylmagnesium chloride and phenylmagnesium bromide.

In the preparation of the catalyst composition, it is preferred to carry out such preparation in the presence of an inert diluent. By way of an example of suitable inert organic diluents can be mentioned liquified ethane, propane, isobutane, n-butane, n-hexane, the various isomeric hexanes, isooctane, isononane, paraffinic mixtures of alkanes having from 8 to 9 carbon atoms, cyclohexane, methylcyclopentane, dimethylcyclohexane, dodecane, industrial solvents composed of saturated or aromatic hydrocarbons such as kerosene, naphthas, and mixtures of any two or more of the foregoing, especially when freed of impurities which characteristically poison Ziegler catalysts, and especially those having boiling points in the range from about $-50°$ C. to about $200°$ C. Also included as suitable inert diluents are benzene, toluene, ethylbenzene, cumene, decalin and the like.

Mixing of the catalyst components to provide the desired catalyst composition is advantageously carried out under an inert atmosphere such as nitrogen, argon or other inert gas.

In the polymerization process employing the aforementioned catalyst composition, polymerization is effected by adding a catalytic amount of the catalyst composition to a polymerization zone containing α-olefin monomer, or vice versa. The polymerization zone is maintained at temperatures in the range of from about $0°$ to about $300°$ C., preferably at slurry polymerization temperatures (e.g., from about $30°$ to about $90°$ C.), for a residence time of about 10 minutes to several hours, preferably from 15 minutes to 5 hours. It is generally desirable to carry out the polymerization in the absence of moisture and oxygen. A catalytic amount of the catalyst composition is advantageously within the range of from about 0.0001 to about 1 milligram-atom of transition metal per liter of diluent. It is understood, however, that the most advantageous catalyst concentration depends upon polymerization conditions such as temperature, pressure, solvent and presence of catalyst poisons. It is further understood that the foregoing range is given to obtain maximum catalyst yields. In the polymerization process, a carrier which may be an inert organic diluent or solvent or excess monomer is generally employed. In order to realize the full benefit of the high efficiency catalyst of the present invention care must be taken to avoid oversaturation of the solvent with polymer. If such oversaturation occurs before the catalyst becomes depleted, the full efficiency of the catalyst is not realized. For best results, it is preferred that the amount of polymer in the carrier not exceed about 50 weight percent based on the total weight of the reaction mixture. Inert diluents employed in the polymerization recipe are suitable as defined as hereinbefore.

The polymerization pressures usually employed are relatively low, e.g., from about 40 to about 500 psig. However, polymerization within the scope of the present invention can occur at pressures from atmospheric up to pressure determined by the capabilities of the polymerization equipment. During polymerization it is very desirable to stir the polymerization recipe to obtain better temperature control, to maintain uniform polymerization mixtures throughout the polymerization zone, and to insure contact between the olefin and the catalyst.

Hydrogen is often employed in the practice of this invention to control molecular weight of the resultant polymer. For the purpose of this invention, it is beneficial to employ hydrogen, when employed, in concentrations ranging from about 0.001 to about 1 mole per mole of monomer. The larger amounts of hydrogen within this range are found to produce generally lower molecular weight polymers. It is understood that hydrogen can be added with a monomer stream to the polymerization vessel or separately added to the vessel before, during or after addition of the monomer to the polymerization vessel, but during or before the addition of the catalyst.

The monomer or mixture of monomers is contacted with the catalyst composition in any conventional manner, preferably by bringing the catalyst composition and monomer together with intimate agitation provided by suitable stirring or other means. In the case of more rapid reactions with more active catalysts, means can be provided for refluxing monomer and solvent, if any of the latter is present, and thus remove the heat of reaction. In any event, adequate means should be provided for dissipating the exothermic heat of polymerization. If desired, the monomer can be brought in the vapor phase into contact with the catalyst composition, in the presence or absence of liquid material. The polymerization can be effected in the batch manner, or in a continuous manner, such as, for example, by passing the reaction mixture through an elongated reaction tube which is contacted externally with suitable cooling medium to maintain the desired reaction temperature, or by passing the reaction mixture through an equilibrium overflow reactor or a series of the same.

The polymer is readily recovered from the polymerization mixture by driving off unreacted monomer and solvent if any is employed. Thus, a significant advantage of the present invention is reduction of the catalyst residues remaining in the polymer. Often, the resultant polymer is found to contain insignificant amounts of catalyst residue such that catalyst removal procedures can be entirely eliminated.

The following examples are given to illustrate the invention, and should not be construed as limiting its scope. All parts and percentages are by weight unless otherwise indicated.

In the following examples, the melt index values, $I_2$, were determined by ASTM D 1238, condition E. The apparent bulk density was determined as an unsettled bulk density according to the procedure of ASTM 1895 employing a paint volumeter from the Sargent-Welch Scientific Company (Catalog no. S-64985) as the cylinder instead of the one specified by the ASTM procedure.

GENERAL PROCEDURE

In each of the following examples, the catalyst components were blended while in a gloved box filled with nitrogen unless otherwise indicated.

EXAMPLE 1

A. Preparation of Catalyst Support

To a beaker was added 0.03 mole of a 0.5 molar solution of dihexyl magnesium in hexane. To this was added 0.03 mole of silicon tetrachloride in a single portion and the total volume of the mixture was adjusted to 400 cc with additional dry hexane. As the mixture was stirred at 25° C. a second solution was added dropwise. This solution consisted of 0.06 mole of normal propyl alcohol dissolved in 50 cc of hexane. No temperature control was maintained. Upon finishing the addition the reaction mixture was stirred for an additional 10 minutes and then the stirring was stopped which allowed the newly formed precipitate to settle. The hexane was decanted and the solid was washed five times with dry hexane and then suspended in 300 cc of hexane with agitation.

B. Preparation of Catalyst

1. To the support prepared in A above was added 0.15 mole of $TiCl_4$ in a single portion followed by a dropwise addition of 0.3 mole of diethyl aluminum chloride (as a 25% solution in hexane). The temperature was maintained below 40° C. during the addition. The resultant brown solid was then allowed to settle and the hexane was decanted. The solid was washed 5 times with dry hexane and suspended in 200 cc of hexane. The Mg:Ti atomic ratio was 0.33:1.

2. To a support prepared as in A above was added 0.01 mole of $TiCl_4$ in a single portion. To this was added dropwise 0.02 mole of diethyl aluminum chloride (25% solution in hexane). The temperature was maintained below 40° C. throughout the addition. The solid was washed 5 times in dry hexane and suspended in 200 cc of hexane. The Mg:Ti atomic ratio was 3:1.

C. Polymerization of Ethylene

1. A one liter, batch reactor fitted with a mechanical stirrer, gas inlet tubes and controlled temperature jacket was filled with 500 cc of dry hexane. Under a nitrogen atmosphere was added 0.6 millimole of triisobutyl aluminum and 0.02 millimole (based on the Ti concentration) of the brown solid catalyst prepared in 2-A. The Al:Ti atomic ratio was 30:1. This mixture was then sealed and purged with hydrogen. The temperature was set at 80° C. and 50 psi hydrogen was introduced. With stirring a constant 170 psi ethylene was added and maintained throughout the 90 minute reaction time. The resultant polyethylene weighed 98 gm. (102,000 g polymer/g Ti), and had a melt index of 0.11 gm/10 min with a 200 gm weight.

2. In like manner as in C-1 ethylene was polymerized employing the catalyst prepared in B-2. The concentration of catalyst was again 0.02 millimole (based on Ti concentration) and 0.6 millimole of triisobutyl aluminum was also used. The Al:Ti atomic ratio was 30:1. The resultant polymer weighed 270 gm (281,000 g polymer/g Ti) and had a 0.28 melt index as measured in example C-1.

EXAMPLE 2

A catalyst prepared as in example 1-B-2 was employed to polymerize ethylene in the same manner as in Example 1-C-1 except that the amount of co-catalyst (triisobutylaluminum) was changed and the effect noted.

(A) 0.02 millimole of catalyst 1-B-2 was employed with 0.2 millimole of triisobutylaluminum. The Al:Ti atomic ratio was 10:1. The resultant polymer weighed 161 gm (168,000 g polymer/g Ti) and had a melt index of 0.13.

(B) 0.01 millimole of catalyst 1-B-2 was employed with 1.0 millimole of triisobutylaluminum. The Al:Ti atomic ratio was 100:1. The resultant polymer weighed 308 grams (643,000 g polymer/g Ti) and had a melt index of 0.32.

EXAMPLE 8

A. Preparation of Catalyst

A solution of n-propylalcohol (7.6 ml, 101 millimoles) in hexane (200 ml) was added dropwise to a stirred solution of 5.7 ml silicon tetrachloride (50 millimoles) and 78 ml 0.637 molar butylethyl magnesium (50 millimoles) in heptane. The solids were allowed to settle and about 140 ml of the supernatant liquid was removed by decantation. Isopar ® E, an isoparaffinic hydrocarbon fraction with a boiling point range of 116°–134° C., was added to give a total volume of 200 ml. The decantation procedure was repeated two more times. The Isopar ® E slurry was mixed with 11.0 ml of titanium tetrachloride (100 millimoles) and heated to 90° C. A solution (68 ml) of 1.46 molar diethylaluminum chloride (100 millimoles) was added dropwise in 30 minutes to the stirred slurry. The slurry was maintained at a temperature of 90° to 100° C. for another 30 minutes and then cooled to room temperature. The hydrcarbon insoluble products were allowed to settle and the supernatant liquid was removed by decantation. The solids were reslurried with fresh hexane and the decantation procedure was repeated five more times to remove the hexane soluble reaction products.

B. Polymerization of Ethylene

Triisobutylaluminum (1.00 millimole) and an aliquot of catalyst containing 0.02 millimole of titanium were added to a stirred 1.8 liter reactor containing 1.0 liter of dry, oxygen-free hexane. The nitrogen atmosphere in the reactor was replaced with hydrogen, the reactor contents were heated to 85° C., and the reactor pressure was adjusted to 70 psig with hydrogen. Ethylene was then added to maintain a reactor pressure of 170 psig. After two hours the reactor contents were filtered and the polyethylene dried in a vacuum overnight at about 60° C. The resultant polymer weighed 144 gm (150,000 g polymer/g Ti), had a bulk density of 14.2 pounds per cubic foot and had a melt index of 0.31.

I claim:

1. A process for the polymerization of one or more alpha olefins under conditions characteristic of Ziegler polymerization which process comprises employing as a polymerization catalyst a composition resulting from the addition of a reducing agent to a mixture of a support suspended in an inert liquid hydrocarbon and a transition metal compound of Groups 4b, 5b, 6b, 7b, or 8 of Mendeleev's Periodic Table under conditions so as to provide a catalytically active solid product and in such proportions that the magnesium:transition metal atomic ratio is from about 0.1:1 to about 30:1 followed by washing the resultant solid catalyst product with an inert liquid hydrocarbon wherein said support comprises the reaction product of (1) a mixture of an organomagnesium compound represented by the formula $MgR_2$ and a silcon halide represented by the formula $R'_{4-n}SiX_n$, said mixture being in a non-polar solvent, with (2) an alcohol represented by the formula $R''OH$; wherein the organomagnesium compound is or can be rendered hydrocarbon soluble and wherein each R, R' and R'' is independently a hydrocarbyl group having from 1 to about 20 carbon atoms, X is Cl, Br or I, n has a value of from 1 to 4 and wherein the molar ratio of $R''OH:MgR_2$ is at least 2:1 and the molar ratio of $R''OH:R'_{4-n}SiX_n$ is sufficient so as to provide at least one X group per OH group.

2. The process of claim 1 wherein R has from about 2 to about 8 carbon atoms, each R' and R'' independently has from about 1 to about 6 carbon atoms, X is chlorine or bromine; wherein the ratio of $R''OH:R'_{4-n}SiX_n$ is sufficient so as to provide from 2 to about 3 X groups per OH group; and wherein said non-polar solvent is a hydrocarbon having from about 5 to about 10 carbon atoms.

3. The process of claim 2, wherein the organomagnesium compound is selected from the group consisting of dibutyl magnesium, butyl isobutyl magnesium, dihexyl magnesium, ethyl hexyl magnesium, dioctyl magnesium and mixtures thereof: the alcohol is selected from the group consisting of ethanol, n-propanol, isopropanol, n-butanol, sec-butanol and mixtures thereof; the silicon halide is selected from the group consisting of $SiCl_4$, $CH_3SiCl_3$, $(CH_3)_2SiCl_2$, $(CH_3)_3SiCl$, $SiBr_4$, $(Et)SiCl_3$ and mixtures thereof; the transition metal compound is that of a metal selected from Groups 4b or 5b of the Periodic Table.

4. The process of claim 3 wherein the transition metal is titanium or vanadium and the magnesium:transition metal ratio is from about 0.2:1 to about 3:1.

5. The process of claim 4 which additionally employs a metallic compound as a cocatalyst which is a halide, hydride or totally alkylated derivative of the metal of Groups 1a, 2a, 2b, 3a or 4a of the Periodic Table and is present in quantities such that the metal:transition metal ratio is from about 1:1 to about 200:1.

6. The process of claim 5 wherein said cocatalyst is an aluminum compound.

7. The process of claim 6 wherein the transition metal compound is titanium tetrachloride and the cocatalyst is triisobutylaluminum.

8. The process of claims 1, 2, 3, 4, 5, 6 or 7 wherein the α-olefin is ethylene or a mixture of ethylene and at least one other polymerizable ethylenically unsaturated compound.

9. The process of claims 1, 2, 3, 4, 5, 6 or 7 wherein component (2) is added in a controlled manner to component (1) at a temperature of about 100° C. or less.

10. The process of claim 9 wherein the temperature is from about 0° C. to about 70° C.

11. The process of claim 9 wherein component (2) is said alcohol dissolved in a non-polar solvent.

12. The process of claim 8 wherein component (1) is added in a controlled manner to component (2) at a temperature of about 100° C. or less and the reducing agent is added at a temperature below about 100° C., such temperature during addition of the reducing agent being below the boiling point of the diluent at the pressure employed.

13. The process of claim 12 wherein component (1) is added at a temperature of from about 0° C. to about 70° C. and the reducing agent is added in a controlled manner at a temperature below about 70° C.

14. The process of claim 12 wherein said alcohol is dissolved in a non-polar solvent.

* * * * *

EXAMPLE 3

A support was prepared in the same manner as in example 1-A employing 0.02 mole of dibutyl magnesium and 0.02 mole of silicon tetrachloride. The 0.04 mole of isopropyl alcohol was added dropwise forming a white precipitate which was decanted and washed 5 times with dry hexane and then suspended in 250 cc of hexane with mechanical agitation.

To this was added 0.01 mole of $TiCl_4$ followed by the dropwise addition of 0.02 mole of diethyl aluminum chloride. The resultant brown solid catalyst was washed several times with hexane. The Mg:Ti atomic ratio was 2:1.

To the same reactor system as employed in example 1-C-1 was added 0.05 millimole (based on Ti concentration) of this catalyst and 2 millimole of triisobutylaluminum. The Al:Ti atomic ratio 40:1. The resultant polyethylene weighed 226 grams (94,400 g polymer/g Ti) and had a 0.4 melt index.

EXAMPLE 4

(A) To a beaker was added 0.05 mole of a 0.5 molar solution of dibutyl magnesium in hexane. To this was added 0.05 mole of silicon tetrachloride in a single portion and the total volume of mixture was adjusted to 500 cc with hexane. The stirring was begun and this solution was heated to 45° C. Next, 0.10 mole of normal propyl alcohol was added dropwise over a 30 minute period. As soon as the exothermic addition was complete, the temperature was rapidly lowered to 25° C. The solid was decanted and washed five times with hexane. Next, 0.15 mole of $TiCl_4$ was added and stirred with the solid in 350 cc of hexane. To this was added 0.30 mole of diethyl aluminum chloride while maintaining a temperature below 40° C. The resulting brown solid catalyst was decanted and washed five times with hexane. The Mg:Ti atomic ratio was 0.33:1.

This material was used in the same reactor and under the same conditions as given in Example 1-A, 0.02 millimole of catalyst (based on Ti concentration) was used in conjunction with 0.6 millimole of triisobutylaluminum. The resultant polymer weighed 134 grams (140,000 g polymer/g Ti) and had a 0.3 melt index. 50% of the polymer was retained by a 100 mesh screen.

(B) The procedure above was followed except that the normal propyl alcohol addition was made at 60° C. instead of 45° C. The resultant polymer weighed 141 grams (147,000 g polymer/g Ti), had a melt index of 0.35 and 30% was retained by a 100 mesh screen.

The above example demonstrated the effect that temperature control during the preparation of the catalyst support has on the particle size of polymers prepared from catalysts supported thereon.

EXAMPLE 5

To a beaker was added 0.025 mole of dihexyl magnesium in hexane. To this was added 0.025 mole of silicon tetrachloride and the volume adjusted to 400 cc of hexane. Normal propyl alcohol (0.05 mole) was diluted with 50 cc of hexane and added dropwise with stirring. The starting temperature of the addition was 25° C. The resulting white solid support was decanted and washed five times with hexane.

To a slurry of the above prepared white solid support in 300 cc of hexane was added 0.025 mole of $TiCl_4$ with stirring. Next was added 0.05 mole of triisobutylaluminum from an 18% by weight solution in hexane. The temperature was maintained below 35° C. during the addition. The resultant solid catalyst was decanted and washed 5 times with hexane. The Mg:Ti atomic ratio was 1:1.

The same reactor and conditions were employed as in example 1-C with the following catalyst amounts, 0.01 millimole of the above prepared catalyst (based on Ti concentration) and 0.3 millimole of triisobutylaluminum were added to the reactor. The Al:Ti atomic ratio was 30:1. The resultant polymer weighed 149 gm (311,000 g polymer/g Ti) and had a melt index of 0.07.

EXAMPLE 6

A. Preparation of Catalyst

To a beaker was added 0.056 mole of di-n, sec-butyl magnesium in hexane. To this was added 0.056 mole of silicon tetrachloride and the volume adjusted to 400 cc of hexane. Normal propyl alcohol (0.112 mole) was diluted with 50 cc of hexane and added dropwise with stirring. The starting temperature of the addition was 10° C. During the addition the temperature was controlled such that the maximum temperature was 12° C. and the final temperature was 8° C. The resulting white solid was decanted and washed five times with hexane.

To a slurry of the white solid in 250 cc of hexane was added 0.112 mole of $TiCl_4$ with stirring. Next was added 0.123 mole of triisobutylaluminum from an 18% by weight solution in hexane. The temperature was maintained at 30° C. during the addition. The resultant solid catalyst was decanted and washed 5 times with hexane. The Mg:Ti atomic ratio was 0.5:1.

B. Polymerization of Ethylene

The same reactor and conditions were employed as in example 1-C with the following catalyst amounts, 0.04 millimole of the above prepared catalyst (based on Ti concentration) and 4.0 millimoles of triisobutylaluminum were added to the reactor. The Al:Ti atomic ratio was 100:1. After a 2 hour reaction time, the resultant polymer weighed 133 gm (69,400 g polymer/g Ti) and had a melt index of 0.60.

EXAMPLE 7

A. Preparation of Catalyst

To a beaker was added 0.120 mole of propyl alcohol dissolved in 200 cc of hexane. A second mixture, comprised of 0.059 mole of butyl-sec-butyl magnesium and 0.059 mole of silicon tetrachloride in 100 cc of hexane, was added to the alcohol solution while it stirred at 30° C. The addition time was approximately 20 minutes. After the exothermic reaction subsided, the resultant white solid was washed several times with fresh hexane. This solid was suspended in 350 cc of hexane and 0.072 mole of titanium tetrachloride was added in a single portion was stirring. To this was added 0.088 mole of diethyl aluminum chloride while maintaining the temperature below 40° C. The resultant brown solid was decanted and washed 5 times with dry hexane.

B. Polymerization of Ethylene

This material was used in the same reactor and conditions as described in Example 1-C. The partial pressure of hydrogen was 30 psi instead of 50 psi, but the remainder of the values were those given in Example 1-C. The catalyst, 0.015 millimole, was placed in the reactor with 0.750 millimole of trisobutylaluminum. The Al:Ti atomic ratio was 50:1. The resultant polymer weighed 185 gm (257,000 g polymer/g Ti) and had a melt index of 0.10.

UNITED STATES PATENT AND TRADEMARK OFFICE
CERTIFICATE OF CORRECTION

PATENT NO. : 4,283,515

DATED : August 11, 1981

INVENTOR(S) : Ronald L. Gibbs

It is certified that error appears in the above—identified patent and that said Letters Patent is hereby corrected as shown below:

Col. 4, line 49, correct the word "contol" to --control--.

Col. 10, line 55, change the word "was" to --with--.

Col. 11, line 20, change the word "hydrcarbon" to --hydrocarbon--.

Col. 11, line 56, Claim 1, change the word "silcon" to --silicon--.

Col. 12, line 12, Claim 3, remove the comma "," after the figure 2.

Signed and Sealed this

Nineteenth Day of January 1982

[SEAL]

Attest:

GERALD J. MOSSINGHOFF

Attesting Officer     Commissioner of Patents and Trademarks